United States Patent [19]

McCarty

[11] Patent Number: 4,578,609
[45] Date of Patent: Mar. 25, 1986

[54] PERMANENT MAGNET DYNAMOELECTRIC MACHINE

[75] Inventor: Frederick B. McCarty, San Pedro, Calif.

[73] Assignee: The Garrett Corporation, Los Angeles, Calif.

[21] Appl. No.: 429,639

[22] Filed: Sep. 29, 1982

[51] Int. Cl.[4] .................................. H02K 21/12
[52] U.S. Cl. .................................. 310/156; 310/191; 310/209
[58] Field of Search .................. 310/156, 190–193, 310/209

[56] References Cited

U.S. PATENT DOCUMENTS

| | | |
|---|---|---|
| 761,682 | 6/1904 | Javaux et al. .................. 310/191 |
| 1,522,742 | 1/1925 | Parvin . |
| 1,763,104 | 6/1930 | Shurtleff . |
| 2,113,102 | 4/1938 | Whittle . |
| 2,573,283 | 10/1951 | Seitz . |
| 2,741,714 | 4/1956 | Regelman . |
| 2,898,486 | 8/1959 | Sheldon .......................... 310/191 X |
| 2,914,939 | 12/1959 | Thillaimuthu . |
| 3,151,261 | 9/1964 | Lee . |
| 3,250,976 | 5/1966 | McIntire ........................ 310/209 X |
| 3,401,290 | 9/1968 | Potter . |
| 3,713,015 | 1/1973 | Frister . |
| 3,889,140 | 6/1975 | Baermann . |
| 4,025,840 | 5/1977 | Brissey et al. ................... 310/191 X |
| 4,027,229 | 5/1977 | Frink ............................... 310/190 X |
| 4,190,794 | 2/1980 | Mikulic ........................... 310/191 X |

Primary Examiner—Donovan F. Duggan
Attorney, Agent, or Firm—Terry L. Miller; Albert J. Miller

[57] ABSTRACT

A variable-voltage electrical generator.

63 Claims, 10 Drawing Figures

PERMANENT MAGNET DYNAMOELECTRIC MACHINE

BACKGROUND OF THE INVENTION

The field of the present invention is apparatus and methods for utilizing a permanent magnet to generate useful electrical power. More particularly, the invention relates to apparatus and methods wherein a permanent magnet is movable relative to a conductor to induce a voltage or electromotive force (e.m.f.) therein. The conductor is connectable in an electrical circuit including a power-consuming electrical load to supply an electrical current flow to the latter. The relationship of the permanent magnet and conductor is selectively adjustable to control the voltage induced in the latter.

Conventional dynamos utilizing permanent magnets are known which are adjustable to control the voltage developed for application to an external electrical load. One such conventional dynamo comprises a stator member carrying an electrical load coil. The load coil includes conductors which are connectable to an external electrical load. In order to adjust the voltage induced in the load coil during operation of this conventional dynamo, the stator member is axially movable relative to a rotor member which carries the permanent magnet. The stator member is movable from a high-voltage position in radial congruence with the rotor member to a low-voltage position wherein the stator member is positioned axially away from radial congruence with the rotor member.

In order to reduce the voltage developed by this conventional dynamo to substantially zero, it must include provision for axially moving the stator member to a position completely out of radial congruence with the rotor member. Of course, such a provision results in this type of dynamo having a large overall axial dimension and being overly heavy in comparison to its electrical capacity. Further, even when the stator member is moved axially to a position completely out of radial congruence with the rotor member, some residual magnetic coupling of the permanent magnet and stator member may persist. This residual magnetic coupling may cause a parasitic torque resisting rotation of the rotor member even though the dynamo is generating no useful electrical power.

Still further, this conventional dynamo must include means for conducting the generated voltage and current flow from the load coil, which moves with the stator member, to an external electrical load. This necessary function is most often fulfilled by the use of multistrand conductors which are sufficiently flexible to allow axial movement of the stator member relative to the remainder of the dynamo. While such multistrand flexible conductors may provide satisfactory short-term service, they will eventually fail with use as the individual strands thereof fatigue and break. Consequently, such conventional dynamos require regular inspection and maintenance including replacement of wearing parts such as the flexible multistrand conductors.

Another conventional permanent magnet dynamo comprises an immovable stator member rotatably receiving a two-part rotor member. Each of the two parts of the rotor member defines a like number of radially outwardly disposed magnetic poles which are of sequentially opposite polarity when considered circumferentially. The two parts of the rotor member are relatively rotatable to bring either like or opposite magnetic poles into axial alignment. When like magnetic poles are axially aligned during operation of the dynamo, both the magnetic flux in the stator member and the voltage induced in a load coil carried thereby are maximum values. In order to selectively reduce the voltage level developed by this dynamo, the two parts of the rotor member are relatively rotated to move opposite magnetic poles toward axial alignment. As opposite magnetic poles are moved toward axial alignment, it is believed that a small portion of the magnetic flux from the poles flows directly to opposite poles and does not penetrate the stator member and the load coil carried thereby. The remaining magnetic flux which does penetrate to the load coil induces an e.m.f. therein which is believed to be self-canceling according to vector principles. When the opposite magnetic poles are fully in alignment, the magnetic flux induces opposing e.m.f.'s in the load coil which fully cancel one another electrically so that the dynamo generates zero voltage during operation.

However, this second conventional dynamo is similar to the first conventinal dynamo described hereinabove in that even when its voltage output is zero, it is believed that there remains a magnetic coupling of the rotor member and stator member. Consequently, iron losses and heating of the dynamo result and the rotor member is subject to a parasitic torque resisting its rotation even though no useful electrical power is generated.

In view of the deficiencies of conventional permanent magnet dynamos, it is not surprising that these devices have not received favorable consideration for use in flywheel energy storage systems having a high energy density and very high speed of operation. Such energy storage systems demand a dynamo to be driven by the flywheel which can provide a substantially constant output voltage despite rotational speed variations having a range of two-to-one, or more. Further, the dynamo must present only a very low or substantially zero parasitic torque drag to the driving flywheel when its voltage output is zero and no useful power is being extracted from the storage system. That is, when the system is merely storing energy it should not run down because of internal energy losses to its dynamo. As a result, conventional flywheel energy storage systems have used conventional rotating rectifyer or homopolar dynamos with electromagnetic field excitation. However, these conventional dynamos are expensive to manufacture, complex in their structure and somewhat large and heavy in comparison to their electrical capacity.

SUMMARY OF THE INVENTION

The present invention provides a permanent magnet dynamo and associated methods wherein a rotatable member and a substantially nonrotatable member cooperate to substantially define a pair of parallel alternative magnetic flux circuits. The rotatable member carries a permanent magnet providing a flow of magnetic flux between opposite poles thereof. One of the pair of flux circuits traverses a load coil while the other of the pair of flux circuits is substantially exclusive of the load coil. A relatively movable member cooperates with one of the rotatable member and nonrotable member to vary the magnetic reluctance of one of the magnetic circuits. In one position of the movable member the one magnetic circuit predominates to carry magnetic flux while in another position of the movable member the other magnetic circuit predominates to carry the magnetic flux. Thus, the magnetic coupling of the rotor member and load coil and the e.m.f. which is developed by the dynamo is adjustable by selective movement of the relatively movable member.

The dynamo of this invention may be defined as an apparatus comprising an electrical conductor connectable to complete an electrical circuit, a permanent magnet movable relative to said electrical conductor, said permanent magnet providing a pair of magnetic poles of opposite polarity and a magnetic flux flowing between said pair of magnetic poles, first means defining a first magnetic circuit for communicating said magnetic flux between said pair of magnetic poles, said first magnetic circuit having a first magnetic reluctance and transecting said electrical conductor to induce an electromotive force therein in response to the combination of movement of said electrical conductor relative to said permanent magnet and flow of said magnetic flux in said first magnetic circuit, second means defining a second alternative magnetic circuit for communicating said magnetic flux between said pair of magnetic poles, said second magnetic circuit having a second magnetic reluctance and being exclusive of said electrical conductor, one of said first and said second means further including a portion which is movable relative to the remainder thereof between a first and a second relative positions for varying one of said first and said second magnetic reluctance, in said first relative position of said movable portion said first magnetic circuit predominating to communicate substantially all of said magnetic flux flow across said electrical conductor, said movable portion shifting to said second relative position to communicate a substantial portion of said magnetic flux flow via said second magnetic circuit to reduce magnetic flux flow in said first magnetic circuit and thereby to adjust said electromotive force.

DETAILED DESCRIPTION OF THE PREFERRED EMBODIMENTS

Figure 1:
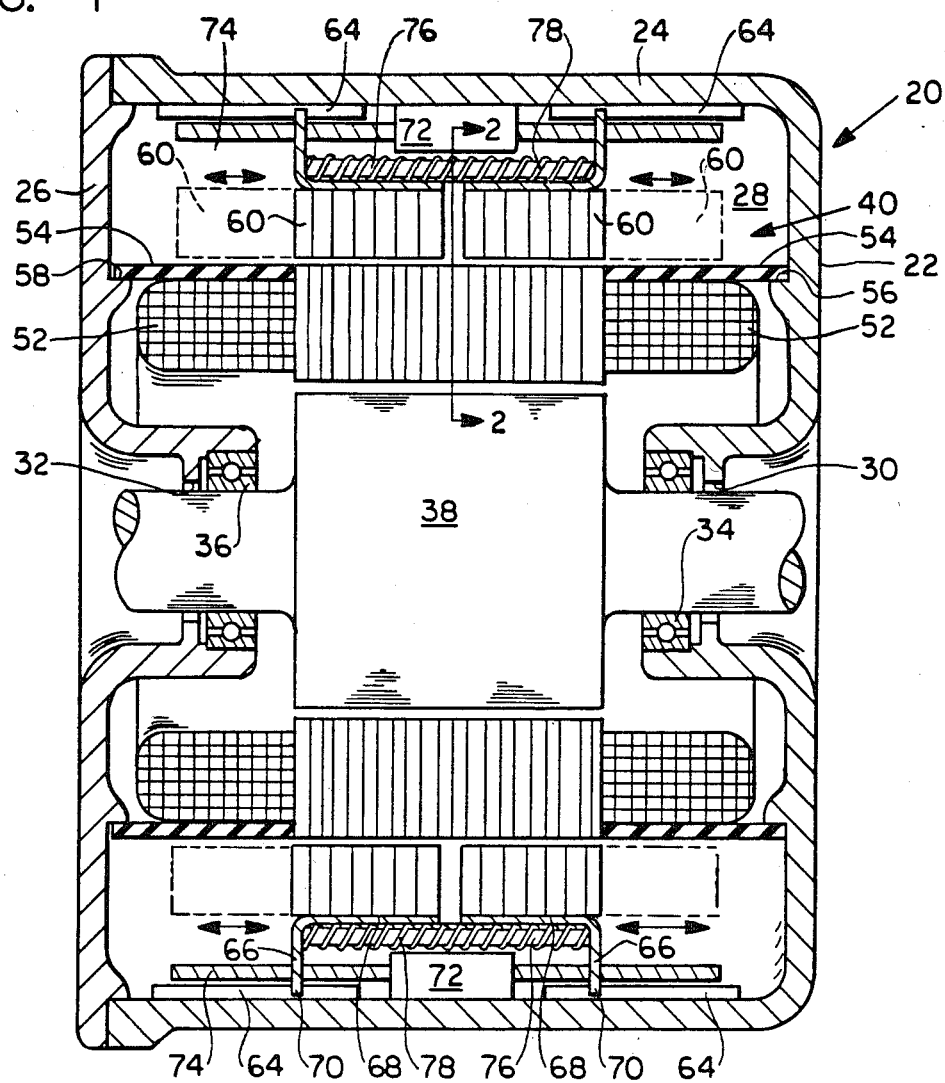
FIG. 1 schematically depicts a longitudinal view, partly in cross section, of a dynamo embodying the invention.

One preferred embodiment of the invention is depicted in FIG. 1, wherein the numeral 20 generally refers to a dynamo for generating alternating electrical current. Dynamo 20 includes a chambered housing 22 comprising a first cup-shaped housing portion 24 and a second generally annular disc-like housing portion 26. Housing portions 24 and 26 cooperate to define a chamber 28 and a pair of bores 30 and 32 axially aligning with one another and opening outwardly from chamber 28. A pair of anti-friction bearings 34 and 36 are respectively received in bores 30 and 32. Journaled in the bearings 34, 36 for rotation in chamber 28 is a rotor member 38 which is to be described in greater detail infra.

Figure 2A:
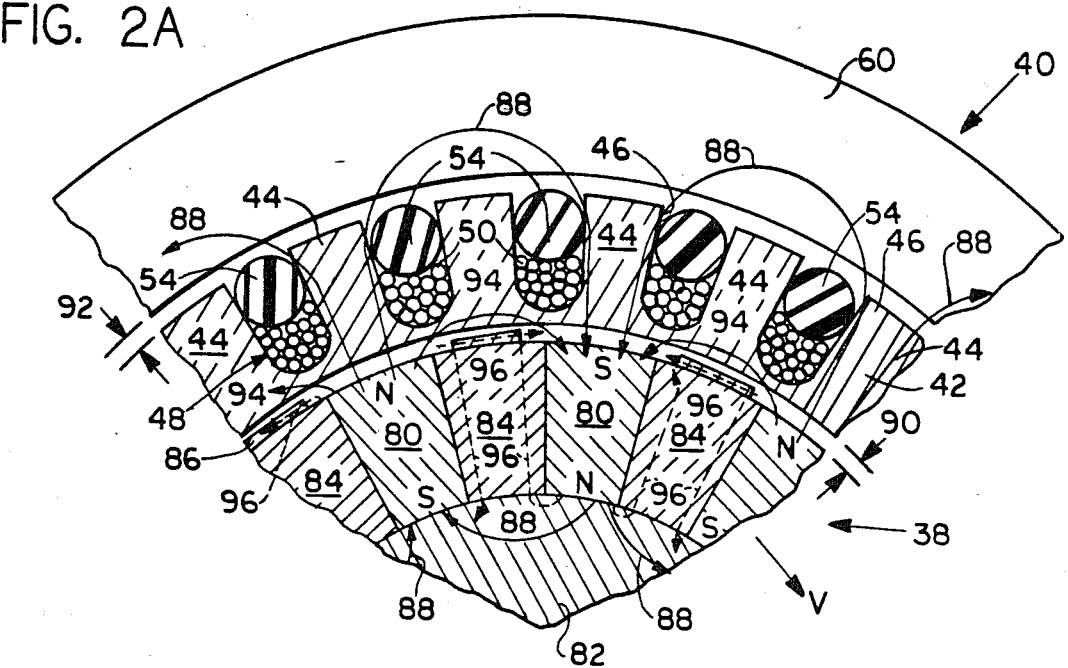
FIGS. 2A and 2B depict fragmentary cross sectional views taken along line 2—2 of FIG. 1 with parts thereof in alternative operative positions.

Also received in chamber 28 with rotor member 38 is a nonrotatable multi-part stator member 40. The stator member 40 circumscribes rotor member 38 and includes a multitude of relatively thin axially-stacked annular laminations 42. Each of the stacked laminations 42 defines a circumferentially extending multitude of radially extending crenellations or projections 44, which are best illustrated viewing FIGS. 2. The projections 44 of axially adjacent laminations 42 are axially aligned and cooperate to define a multitude of axially extending channels 46 opening radially outwardly on the stator member 40.

A number of electrical stator windings or load coils 48 are received in the channels 46, viewing FIGS. 1 and 2. Each load coil 48 includes a conductor 50 which is looped many times through a pair of the channels 46 to define end turn portions 52 extending externally of the stator member 40 at each end thereof. The individual load coils 48 are arranged for connection to an external electrical load by conventional electrical lead outs (not shown) passing to the outside of housing 22.

Also received in the multitude of channels 46 is a corresponding multitude of annularly arranged and axially extending nonmagnetic but magnetically permeable fiberglass rod members 54. The rod members 54 extend axially beyond the ends of the stator member 40 to engage at their opposite ends with a pair of annular shoulders 56, 58 respectively defined on the housing portions 24 and 26. The stator member 40, load coils 48 and rod members 54 are united into a unitary subassembly by impregnation with a potting compound, which is subsequently cured, such as with an epoxy. Consequently, the rod members 54 cooperate with the shoulders 56, 58 to support stator member 40 within chamber 28 and concentric with rotor member 38. The stator member in turn supports the load coils 48.

Circumscribing the remainder of the stator member 40 and comprising a portion thereof is a pair of substantially identical laminated annular back-iron members 60 and 62. The back-iron members 60, 62 are movable in chamber 28 between a first position in radial congruence with the remainder of stator member 40, as illustrated in solid lines viewing FIG. 1, and a second position which is illustrated with dashed lines in FIG. 1. It will be noted that in their second position the back-iron members 60, 62 are completely out of radial congruence with the remainder of stator member 40.

In order to movably support the back-iron members 60 and 62, the housing portion 26 defines a plurality of axially and radially inwardly extending guide rail portions 64 (only two of which are visible viewing FIG. 1). Slidably engaging the guide rail portions 64 is a pair of annular members 66 which are each L-shaped in axial cross section. Each one of the L-shaped annular members 66 includes an axially extending leg 68 which is secured to a respective one of the pair of back-iron members 60, 62. The other leg 70 of each L-shaped annular member 66 slidably engages the guide rail portions 64. The guide rail portions 66 allow relative sliding axial movement of the L-shaped annular members 66 while constraining rotational movement thereof.

Disposed between the pair of L-shaped annular members 66 on housing portion 24 is a plurality of reversible linear actuators 72 (only two of which are visible viewing FIG. 1). Each actuator 72 rotatably journals an axially immovable, elongate and axially extending actuator screw 74. The opposite end portions of each actuator screw 74 define screw threads of opposite pitch. Each actuator screw 74 threadably engages both of the pair of L-shaped annular members 66. Actuators 72 are arranged to rotate the actuator screws 74 in unison. Consequently, when the actuator screws 74 are simultaneously rotated by actuators 72, the L-shaped members 66 carry back-iron members 60 and 62 between their first and second positions, as is illustrated in FIG. 1 by double-headed arrows. A number of telescopic spring guides 76 (only two of which are illustrated) extend axially between the pair of L-shaped annular members 66. Each spring guide 76 carries a coil compression spring 78 yieldably biasing the members 66 axially apart.

While keeping in mind the structure described supra, attention may now be given to the structure of rotor member 38. Viewing FIG. 2A, it will be seen that the rotor member 38 includes a multitude of circumferentially spaced apart permanent magnets 80. The magnets 80 extend axially within the rotor member 38 from substantially one end of stator member 40 to the other end thereof. Each one of the plurality of magnets 80 is radially polarized and the plurality of magnets 80 is arranged to radially outwardly present sequentially opposite magnetic poles circumferentially around the rotor member 38. The north and south magnetic poles of magnets 80 are represented in the Figures with the characters 'N' and 'S', respectively. Within the rotor member 38, the radially inwardly disposed magnetic pole of each magnet 80 is disposed adjacent to a ferromagnetic core portion 82 of the rotor member 38. Interposed between each adjacent pair of magnets 80 is one of a multitude of axially extending aluminum alloy bars 84. The aluminum alloy material from which bars 84 are formed is nonmagnetic and presents a relatively high reluctance to magnetic flux penetrating therethrough. Carried upon each one of the multitude of aluminum alloy bars 84 is one of a corresponding multitude of axially extending ferromagnetic shunt members 86. Each shunt member 86 extends circumferentially from adjacent one magnet 80 toward but short of the next circumferentially adjacent magnet 80. In other words, the circumferentially disposed edges of the shunt members 86 are spaced circumferentially away from each magnet 80.

During operation of the dynamo 20, the rotor member 38 is rotatably driven at a constant or variable rotational speed (as is indicated by arrow V, viewing FIGS. 2) by an external driving apparatus (not shown). When the back iron members 60, 62 are axially translated toward one another to their first position in radial congruence with rotor member 38, as is illustrated by solid lines in FIG. 1, the paths of the magnetic flux within the dynamo 20 are as illustrated by arrows viewing FIG. 2A. Arrows 88 on FIG. 2A indicate the path of the predominant magnetic flux flowing conventionally from each north magnetic pole to receiving south magnetic poles. It will be seen upon examination of FIG. 2A that the predominant flux from each radially outwardly disposed north magnetic pole extends radially outwardly across an air gap 90 defined between the rotor member 38 and stator member 40. Within the stator member 40, the predominent flux 88 extends radially outwardly to enter back iron members 60, 62 by crossing an air gap 92 defined between the back iron members and the remainder of the stator member 40. The predominent flux 88 then extends circumferentially in opposite directions within back iron members 60, 62 to turn radially inwardly and communicate with a next circumferentially adjacent radially outwardly disposed south magnetic pole of a magnet 80. From the radially inwardly disposed north magnetic poles, the predominent flux 88 communicates through the core portion 82 to next adjacent south magnetic poles. Arrows 94 on FIG. 2A indicate that some magnetic flux communicates circumferentially within the stator member 40. Similarly, dashed arrows 96 indicate that a small flux leakage occurs through the shunt members 86 and through the aluminum alloy bars 84. However, this leakage flux 96 is relatively small in relation to the flux 88. Similarly, the stator member 40 has a relatively large magnetic reluctance in the circumferential direction because of the small physical size of stator member bridge portions 98 thereof. The bridge portions 98 conduct flux 94. Consequently, flux 94 is small in relation to predominent flux 88. As a result, the arrows 88 represent the path of the markedly predominent magnetic flux within dynamo 20 with back-iron members 60, 62 in their first positions. It will be understood that the magnetic flux pattern described supra rotates with the rotor member 38. Consequently, the magnetic flux in path 88 transects the conductors 50 to induce an e.m.f. therein for connection to the external electrical load.

Figure 2B:
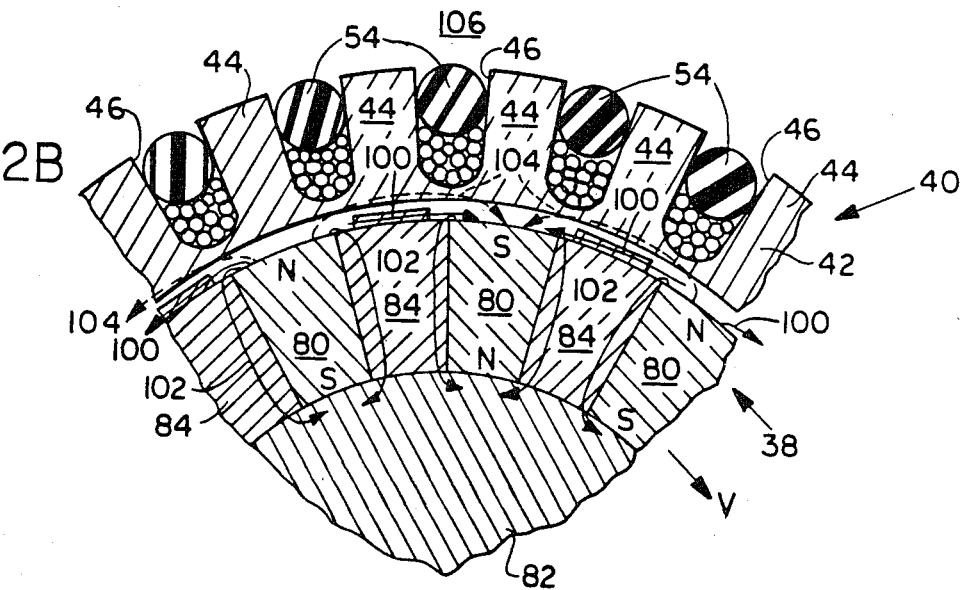

FIG. 2B depicts the dynamo 20 and the magnetic flux distribution therein with the back-iron members 60, 62 thereof moved completely out of radial congruence with the remainder of stator member 40 and to their second position. Viewing FIG. 2, arrows 100 indicate an alternative magnetic flux path which carries the predominent flux when the back-iron members 60, 62 occupy their second positions. The arrows 100 indicate that the predominent magnetic flux traverses the shunt members 86. An additional lesser flux flow traverses the high-reluctance bars 84, as is represented by arrows 102. Further, the bridge portions 98 of stator member 40 present a pathway for an almost insignificant flux flow indicated by dashed arrows 104. However, the relatively large circumferential reluctance of the stator member 40 in combination with the large reluctance presented by an air space 106, which is created by the movement of back-iron members 60, 62 to their second positions, substantially prevents flux flow through the potential flux path represented by dashed arrows 108. Because there is no significant flux flow through stator member 40 radially outwardly of bridge portions 98 thereof, the conductors 50 are substantially free of transecting magnetic flux and the e.m.f. induced therein is substantially zero. Further, the only magenetic flux linking the stator member and rotor member 38 is represented by dashed arrows 104 and is almost insignificant. As a result, iron bosses in the stator member 40 and magnetically induced parasitic torque drag on rotor member 38 are also almost insignificant during operation of dynamo 20 with back-iron members 60, 62 in their second positions.

In view of the above, it will be seen that an illustrative analogy may be made between the magnetic flux flow in magnetic circuits 88, 100, and electrical current flow in analogous electrical circuits. In the magnetic circuits 88, 100, the magnets 80 are analogous to primary electrical cells while the back iron members 60, 62 are analogous to low-resistance circuit elements. In the first position of members 60, 62, the magnetic reluctance (resistance) of circuit 88 is low in comparison to that of circuit 100. Consequently, the predominent flux (current) flows in circuit 88 with little flux flow in circuit 100. However, when the back-iron members 60, 62 are shifted to their second positions, these low resistance circuit elements are effectively removed from the magnetic circuit and are replaced by a high resistance element, the air space 106. Thus, the predominant flux flow from magnets 80 follows the alternative path presented by the shunt members 86, i.e., the circuit 100.

It will be recognized that back-iron members 60, 62 are selectively positionable between their first and second positions by selective operation of actuators 72. Consequently, the dynamo 20 is selectively operable according to the position illustrated by FIG. 2A to produce a maximum voltage in view of its rotational speed, or according to the position of FIG. 2B to produce substantially zero voltage, or at any operating configuration and voltage level therebetween. That is, as the back-iron members 60, 62 are moved between their first and second positions, the relative reluctance of the two alternative flux paths for the predominent flux flow, i.e. paths 88 and 100, smoothly varies so that the magnetic flux in these paths and the voltage developed by dynamo 20 also smoothly varies.

Figure 3:
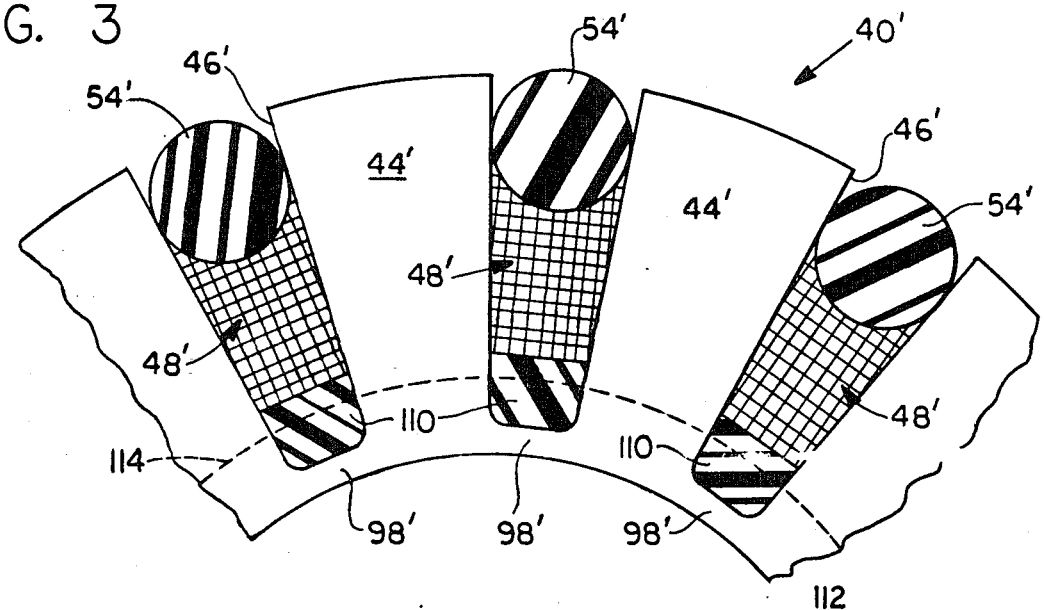
FIG. 3 is similar to FIGS. 2 and depicts a fragmentary transverse cross sectional view of an alternative embodiment of the invention with parts thereof removed for clarity of illustration.

FIG. 3 depicts an alternative embodiment of the invention during manufacture of a component thereof. In many ways, the embodiment illustrated by FIG. 3 is analogous to the embodiment depicted by FIGS. 1 and 2. Accordingly, features of FIG. 3 which are analogous in structure or function to features of FIGS. 1 and 2 are referenced with the same numeral used supra and having a prime added. FIG. 3 fragmentarily depicts a stator member 40' for a dynamo. The stator member 40' as a subassembly includes a multitude of axially extending phenolic or fiberglass bars 110 which are individually received into the bottoms of channels 46' adjacent to bridge portions 98' of stator member 40'. Stator member 40' and bars 110 are united into a unitary subassembly along with load coils 48' and a multitude of rod members 54' by a cured potting compound, as explained supra. After the unitary subassembly including stator member 40' is formed, a radially inner portion 112 of the stator member 40' (which is delineated by line 114) is removed along with a portion of each bar 110, as by machining. Removal of the portion 110 of the stator member 40' also removes the bridge portion 98' thereof. Consequently, the circumferential conduction of flux in these bridge portions is prevented. It follows in view of the discussion supra pertaining to FIGS. 1 and 2 that the magnetic coupling of stator member 40' and a rotor member (not shown) and the parasitic torque drag therebetween, is virtually eliminated when the back-iron members of this embodiment of the invention are in their second positions. It is easily seen that the inner diameter of stator member 40' when ready for use in a dynamo is defined by line 114. Thus, a rotor member is chosen for use with stator member 40' so that a proper air gap is defined therebetween.

Figure 4:
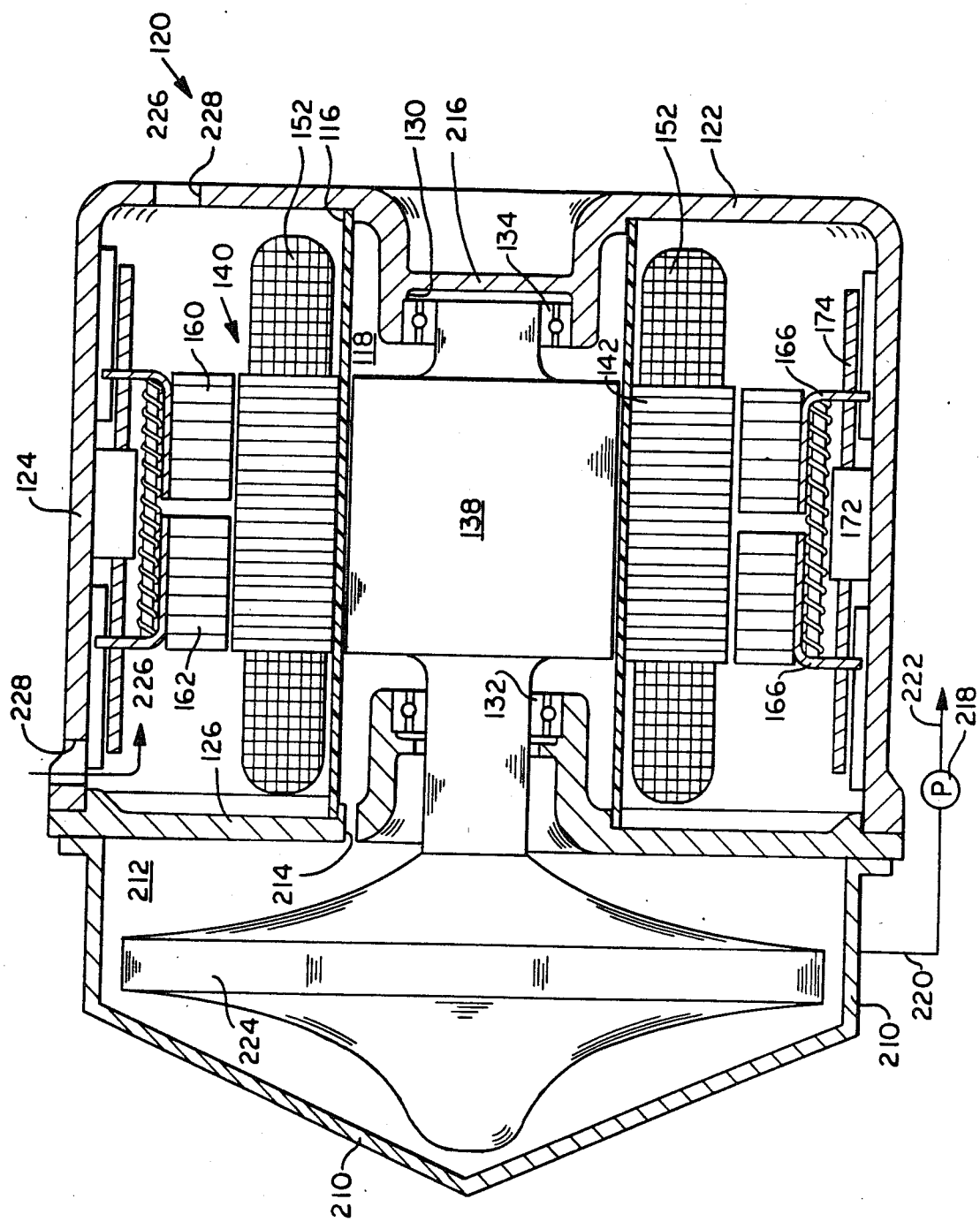
FIG. 4 depicts a fragmentary longitudinal view, partly in cross section and somewhat schematic, of an alternative embodiment of the invention.

Yet another alternative embodiment of the invention is illustrated by FIG. 4. Because the embodiment illustrated by FIG. 4 is similar in many respects to the embodiments illustrated by FIGS. 1 and 2, features of FIGS. 4 which are analogous in structure or function to features described supra are referenced with the same numeral used hereinbefore and increased by 100.

FIG. 4 illustrates a dynamo 120 including a housing 122 and a rotor member 138 jounaled therein. Dynamo 120 includes an elongate inperforate but magnetically permeable fiberglass sleeve member 116 circumscribing the rotor member 138. The sleeve member 116 sealingly and supportingly engages the housing 122 at each end to substantially define a cavity 118 therein. A stator member 140 circumscribes the sleeve member 116 and is supported thereby in much the same way that the multitude of rods 54 support the stator member 40, recalling FIGS. 1 and 2. Movably disposed around the stator member 140 is a pair of back-iron members 160, 162.

Secured to housing 122 is an enclosure 210 which cooperates with housing 122 to define a cavity 212. Cavity 212 communicates with cavity 118 within dynamo 120 via a passage 214 defined by housing 122. It will be noted that the housing 122 defines a web 216 which spans and closes the right end of bore 130 rightwardly of bearing 134. Thus, the housing 122 and enclosure 210 cooperate with sleeve member 116 to define a substantially closed volume comprising cavities 116 and 212. A vacuum pump 218 communicates via a conduit 220 with the cavity 212 so that the latter may be evacuated by operation of the pump 218. The pump 218 exhausts to atmosphere as indicated by arrow 222.

Rotatably disposed in cavity 212 and drivingly connected with rotor member 138, viewing FIG. 4, is a flywheel member 224. The flywheel member 224 is in energy exchange relation with the dynamo 120 so that the latter may convert kinetic energy stored by the flywheel member 224 into electrical energy. The flywheel 224 may be charged with kinetic energy either by operation of dynamo 120 as a motor or by other drive means (not shown) which are coupled with flywheel member 224.

In light of the above, it is apparent that operation of vacuum pump 218 to evacuate cavity 212 also is effective to evacuate cavity 118 within dynamo 120 via passage 214. Consequently, both the flywheel and rotor members 224 and 138 may spin in evacuated cavities while being substantially free of energy losses to windage and turbulence. The sleeve member 116 sealingly cooperates with housing 122 to prevent the entrance of air into the cavity 118 while allowing the load coils 148 to be exposed to a cooling air flow, represented by arrows 226, which is directed through housing 122 as by apertures 228 defined therein.

Figure 5:
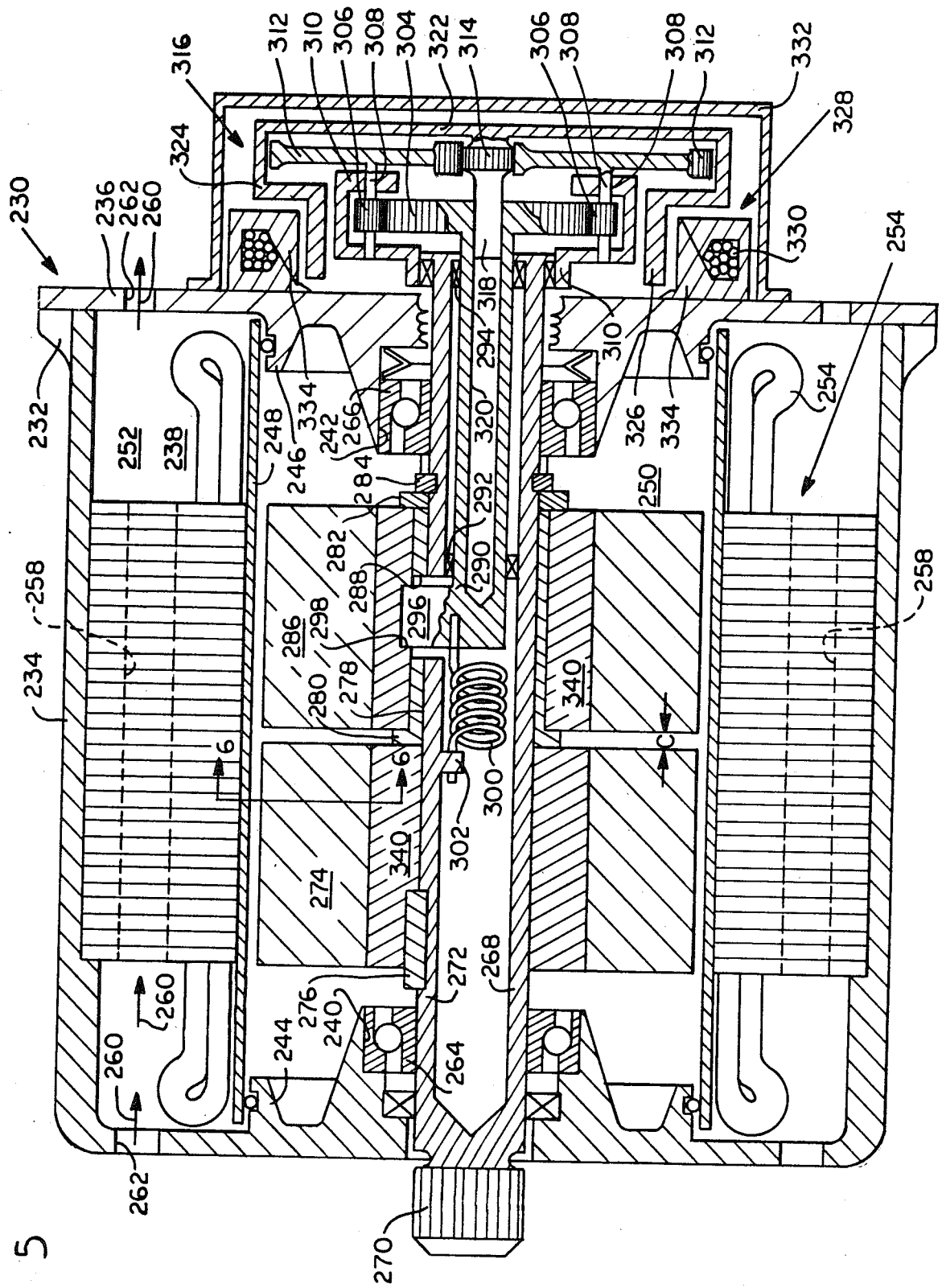
FIG. 5 illustrates a longitudinal cross sectional view of yet another alternative embodiment of, the invention which is depicted somewhat schematically.

Another alternative embodiment of the invention is illustrated by FIG. 5 wherein a dynamo 230 includes a two-part chambered housing 232. The housing 232 includes a cup-shaped portion 234 and a disk-like annular portion 236. The housing portions 234 and 236 cooperate to define a chamber 238 therein and a pair of axially aligning bores 240, 242. Further, the housing portions 234, 236 each define one of a pair of axially extending annular shoulders 244, 246 which cooperate to carry an inperforate fiberglass sleeve member 248 which is magnetically permeable. The sleeve member 248 sealingly divides chamber 238 into a central cavity 250 and a radially outer annular cavity 252 which circumscribes cavity 250.

An annular stator member 254 is immovably received in cavity 252. The stator member 254 carries electrical load coils 256 which are connectable to an external electrical load by electrical lead out conductors (not shown). Stator member 254 also defines a multitude of axially extending cooling passages 258 (only two of which are illustrated, viewing FIG. 5). In order to provide for a cooling air flow through passages 258 (as is represented by arrows 260), the housing 232 defines a number of axially extending apertures 262.

Within the cavity 250, a pair of anti-friction bearings 264, 266 are respectively received in the bores 240, 242 to journal a partially hollow shaft member 268. The shaft member 268 defines a splined external drive portion 270 and an axially extending bore 272 opening rightwardly on the end of shaft member 268 oppositely from drive portion 270. Shaft member 268 carries a first rotor member 274 which is drivingly coupled to shaft member 268 by a key member 276. Abutting rotor member 268 on the right side thereof, viewing FIG. 5, is a flanged annular bushing member 278. The bushing member 278 defines a radially extending flange portion 280 which is relatively thin in the axial direction. At its right end, the bushing member 278 abuts an annular thrust washer 282 which is trapped thereagainst by a retaining ring 284 engaging shaft member 268.

A second rotor member 286 is rotatably carried on bushing member 278 between the flange 280 thereof and thrust washer 282. Both the first and second rotor members 274 and 286 are similar in construction and are to be described in further detail infra. As will be clear in light of the following description, selective relative rotation of the first and second rotor members 274 and 286 is effective to vary the voltage produced by dynamo 230 during operation thereof.

In order to provide for selective relative rotation of the rotor members 274, 286, the shaft member 268 and bushing member 278 cooperate to define a radially outwardly extending aperture 288. A quill shaft 290 is journaled within bore 272 by a pair of bearing members 292, 294. The quill shaft 290 defines at its leftward end a lug portion 296 which extends radially outwardly through the aperture 288 to engage a matching socket 298 defined by the second rotor member 286. Thus, the second rotor member 286 is coupled for rotation in unison with quill shaft 290. A coil torsion spring 300 engages the shaft member 268 at an inwardly extending projection 302 and also engages the quill shaft 290 to rotatably bias the latter and second rotor member 286 to a first relative rotational position. As will be explained in greater detail infra, when the second rotor member 286 is rotated to its first position relative to first rotor member 274, the voltage induced in load coils 256 during operation of dynamo 230 is a maximum value in view of the particular speed of operation of the dynamo.

In order to selectively rotate the second rotor member 286 relative to shaft member 268 and first rotor member 274, the quill shaft 290 drivingly carries an annular gear member 304. The gear member 304 meshes with a pair of smaller gears 306 which are drivingly coupled with shafts 308. An annular carrier member 310 is rotatably carried upon shaft member 268 and in turn rotatably carries the shafts 308. At their right ends, viewing FIG. 5, the shafts 308 each carry a gear member 312. Meshing with the gear members 312 is a gear portion 314 of an armature member 316. The armature member 316 includes a stub shaft portion 318 which is rotatably received in a bore 320 defined by quill shaft 290. Armature member 318 also includes a radially extending disc portion 322 which carries an annular rim portion 324. The rim portion 324 extends axially and radially inwardly to overlie the carrier member 310 and define a circumferentially continuous annular induction ring portion 326. The induction ring portion 326 is received within an annular electromagnetic field coil assembly 328 which is secured to housing 232. The field coil assembly includes an electrical winding 330 which is connected by lead outs (not shown) to an external control circuit (also not shown). The lead outs penetrate a cover member 332 which is also secured to housing 232. Field coil 328 is arranged to present to induction ring 326 a circumferentially disposed multitude of pole faces 334 (only two of which are visible viewing FIG. 5). When the winding 330 is energized, circumferentially adjacent ones of the pole faces 334 are of opposite magnetic polarity. That is, the field coil assembly 328 presents a circumferentially extending multitude of sequentially opposite magnetic pole faces 334 to the induction ring 326.

During operation of the dynamo 230, the shaft member 268 is rotatably driven by an external power source (not shown). The shaft member 268 in turn directly drives the first rotor member 274 via key 276. Similarly, the second rotor member 286 is also driven by shaft member 268 via torsion spring 300. The spring rate and preload of spring 300 is sufficient to overcome all drag torques including magnetic drag torque on rotor member 286 so that the latter rotates in unision with the shaft member 268 and rotor member 274. The spring 300 biases a circumferential surface (not shown) of lug portion 296 into engagement with a circumferential edge of aperture 288 to define the first relative position of rotor members 274 and 286.

In order to selectively rotate the second rotor member 286 relative to first rotor member 274 during operation of dynamo 230 so as to reduce the voltage level produced thereby or to maintain the voltage level substantially constant despite a reduction of the electrical load connected to lead coils 256, a D.C. exciting current is supplied to winding 330 of field coil assembly 328. Consequently, a retarding torque is imposed on armature member 316. Examination of gear member 304, gears 306, shafts 308 and carrier 310, along with gear members 312 and gear portion 314 will reveal that these foregoing parts cooperate to define a planetary speed reducing gear train interposed between the armature member 316 and second rotor member 286. Because the above-described planetary gear train provides a high ratio of torque multiplication, about 50 to 1, the retarding torque on armature 316 is sufficient to overcome torsion spring 300 and relatively rotate the rotor member 286 toward the second relative position thereof. That is, while both rotors 274 and 286 rotate in a forward direction, the rotor member 286 rotates more slowly and is retarded relative to rotor member 274 until a torque balance is achieved between torsion spring 300 and the retarding torque applied to armature member 316. It will be appreciated in light of the above that while rotor member 286 is being retarded relative to rotor member 274 so that the voltage level and electrical power output of load coil 256 decreases along with the magnetically induced drag torque on rotor member 286, the preload of spring member 300 is increased to a greater degree than the diminution of magnetic drag torque so that there exists a proportionality between the voltage level supplied to field coil 328 and relative retardation of rotor 286. Such a relationship has inherent advantages with regard to stable and simplified voltage regulation of the dynamo 230.

It will be apparent to those skilled in the pertinent art that other relationships are possible between the rotor members 274, 286, torsion spring 300, and armature member 316. That is, torsion spring 300 can be used to bias rotor members 274, 286 to their second relative position and retardation of armature member 316 can then be used to relatively rotate the rotor members 274, 286 toward their first relative position.

Figure 6:
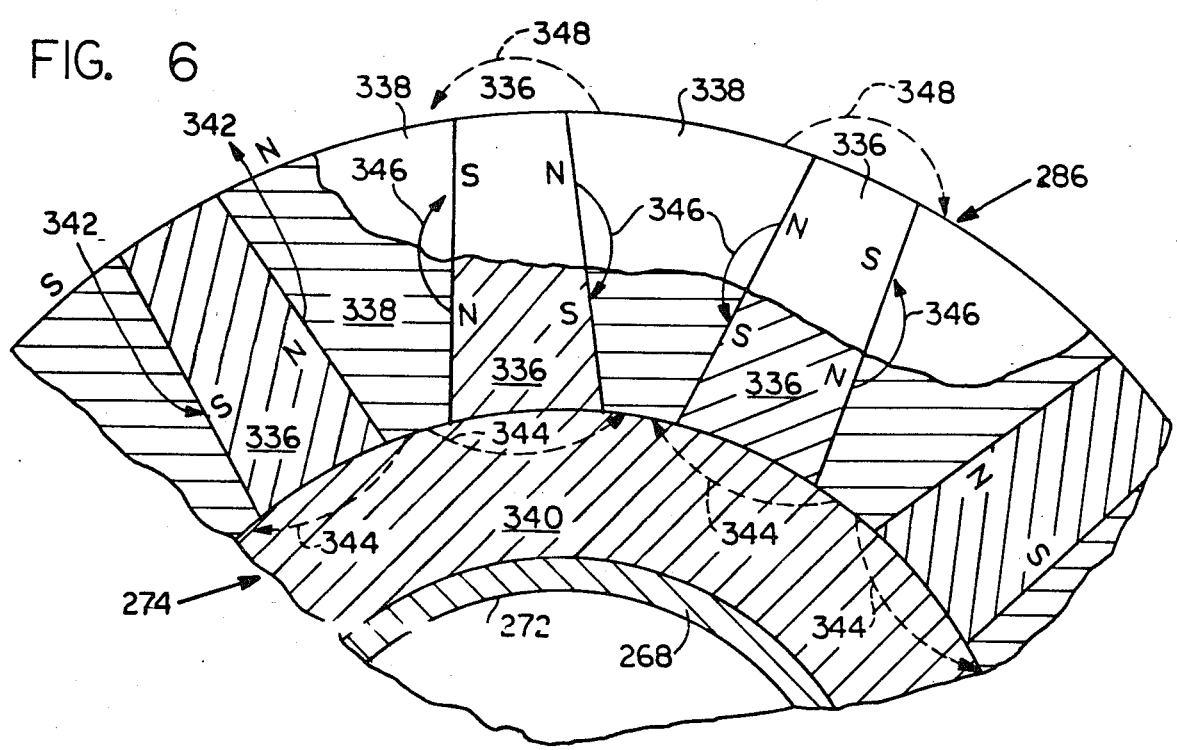
FIG. 6 depicts a fragmentary cross sectional view taken along line 6—6 of FIG. 5 with a poriton thereof broken away for clarity of illustration.

While keeping in mind the structure depicted by FIG. 5, attention may now be directed to the structure and function of rotor members 274 and 286, which are illustrated by FIG. 6. The rotor members 274, 286 each comprise a multitude of axially extending permanenet magnets 336. Each of the permanent magnets 336 is circumferentially polarized with like magnetic poles of adjacent magnets confronting one another. Disposed between each of the confronting poles of adjacent magnets is one of a multitude of axially of axially extending ferromagnetic pole pieces 338. The pole pieces 338 are magnetically conductive. Consequently, pole pieces 338 are capable of presenting radially outwardly disposed magnetic poles to the stator member 254, as is illustrated by the left-hand portion of FIG. 6. Circumferentially adjacent ones of the magnetic poles on pole pieces 338 are of opposite polarity. Arranged within each one of the rotor members 274, 286 is one of a pair of non-magnetic hub members 340. The hub member 340 of rotor member 274 is keyed to shaft member 268 by key 276 while the hub member 340 of rotor member 286 rotatably rides upon bushing member 278, viewing FIG. 5.

Turning once again to the left-hand portion of FIG. 6, when the rotor members 274, 286 are in their first relative position, like-polarized pole pieces 338 of each rotor member are axially aligning. As a result, magnetic flux flows from north-magnetized pole pieces 338 radially outwardly into the stator member 254 to proceed circumferentially and then radially inwardly to a south-magnetized pole piece 338. This flux flow is illustrated by arrows 342. It can be seen, viewing FIG. 6, that the hub members 340 present a high-reluctance barrier to flux flow around the radially inner ends of the magnets 336, as is depicted by dashed arrows 344. Consequently, flux flow in the path depicted by arrows 344 is almost insignificant.

When the rotor members 274, 286 are shifted to their second relative rotational position, as is depicted by the cut-away right-hand portion of FIG. 6, oppositely-polarized pole pieces 338 are axially aligning. Consequently, the predominent magnetic flux flows axially between the rotor members 274, 286, as is illustrated by arrows 346. Viewing FIG. 5 once again, it will be recalled that the rotor members 274, 286 are separated axially by a relatively small air gap clearance C. Because the air gap clearance C is small, the reluctance presented thereby is also small. As a result, when the rotor members are in their second relative position, the predominent flux flow is short circuited within the rotor members 274, 286. An almost insignificant flux flow may extend radially outwardly toward stator member 254, as depicted by dashed arrows 348. However, the flux flow in path 348 is of such a low level that parasitic torque, iron losses and heating in the stator member 254 caused thereby are nill.

Figure 8:
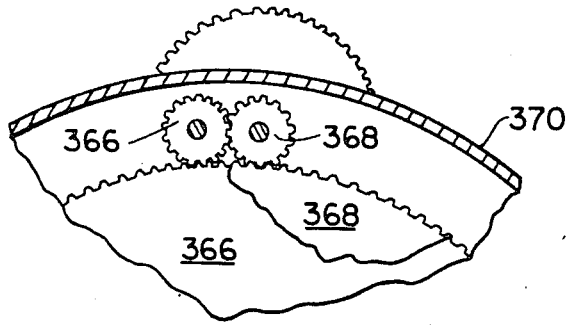
FIG. 8 depicts a fragmentary cross sectional view taken along line 8—8 of FIG. 7.
Figure 7:
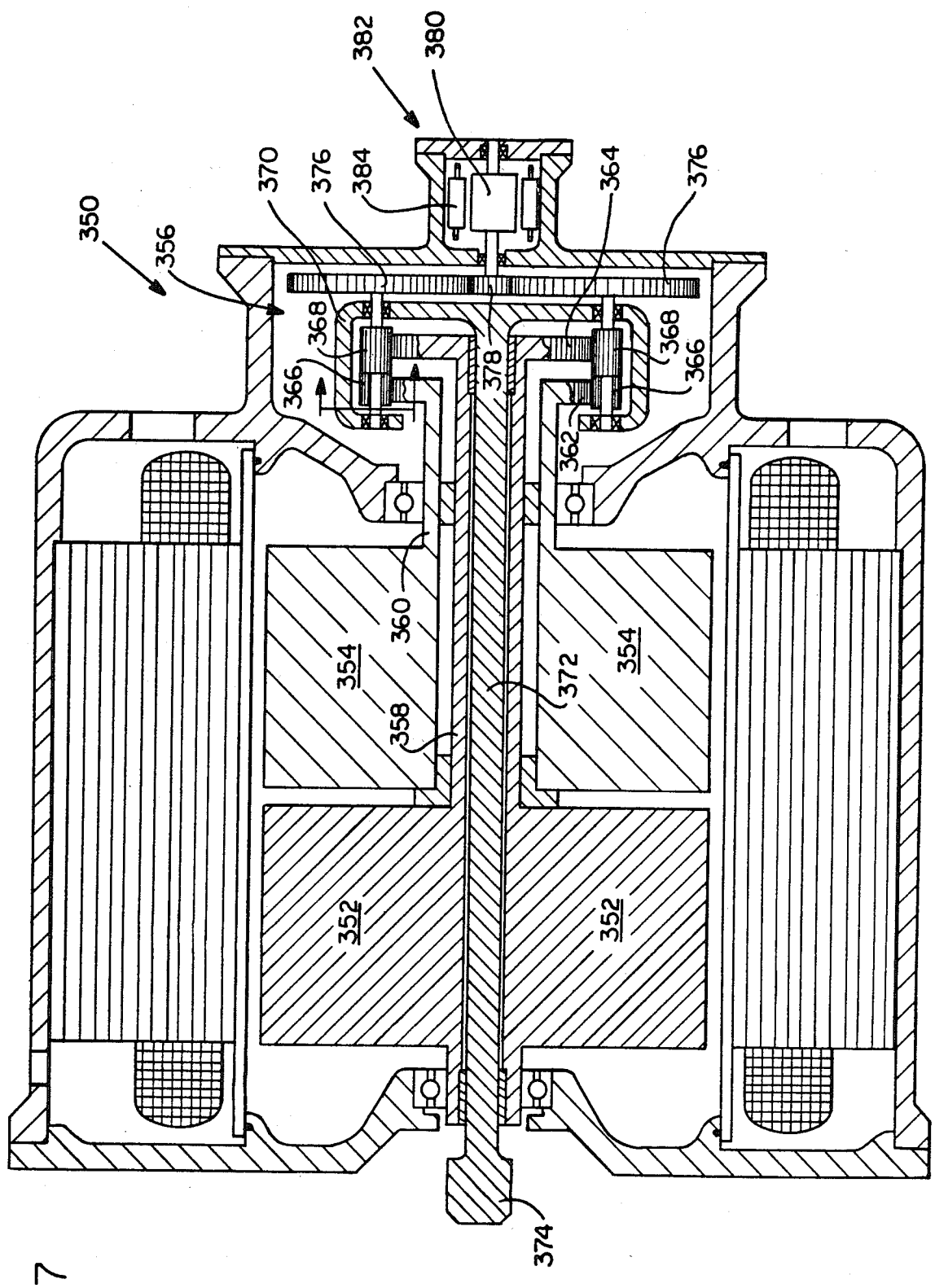
FIG. 7 illustrates a longitudinal view, partly in cross section, of another alternative embodiment of the invention.

Yet another alternative embodiment of the invention is depicted by FIG. 7, wherein a dynamo 350 comprises many features which are similar to features described supra with regard to FIGS. 5 and 6. These now familiar features will not be further described. While the dynamo 350 includes a first rotor member 352 and a second rotor member 354 which are similar in structure and function to rotor members 274 and 286 described supra, the relative rotational position of rotor members 352, 354 is controlled by an adjusting mechanism generally referenced with the numeral 356. The adjusting mechanism 356 includes respective hollow shaft portions 358, 360 of rotor members 352, 354. At their right ends, viewing FIG. 7, the shaft portions 358, 360 couple with respective gear members 362, 364 which are of equal diameters. Each of the gear members 362, 364 meshes with a respective one of a pair of equal diameter pinion gear members 366, 368. The pinion gear members 366, 368 mesh with one another, as is best illustrated viewing FIG. 8, and rotatably are carried by a carrier member 370. Carrier member 370 is coupled with a quill shaft 372 which extends axially through rotor members 352, 354 to define a splined drive portion 374, external to the housing of dynamo 350. One of the pair of pinion gear members, member 368, is coupled with a gear member 376. The gear member 376 meshes with a pinion gear 378 which is coupled with an armature member 380 of a servo motor 382. Servo motor 382 includes a stator portion 384 having electrical windings connected to an external control circuit (not shown).

During steady state operation of the dynamo 350, the quill shaft 372 is rotatably driven by an external power source (not shown). The quill shaft 372 rotates the carrier member 370. Because the rotor members 352, 354 are of substantially equal size and provide substantially equal torques resisting their rotation, the carrier member rotatably drives the rotor members in unison without relative rotation of the gear members 362, 364 or pinion gear members 366, 368. Consequently, the armature 380 of servo motor 382 is driven in unison with the quill shaft 372 and rotor members 352, 354 by gear member 376 meshing with pinion gear 378. In this mode of operation, it may be necessary to provide a small maintenance A.C. excitation current to the stator portion 384 of servo motor 382 to assist the rotation of armature member 380 in unison with quill shaft 372.

In order to move the rotor members toward a first relative rotational position wherein the voltage provided by dynamo 350 is essentially zero, the A.C. excitation current supplied to servo motor 382 is increased above the maintenance current level. Consequently, the armature member 380 begins to rotate at a greater speed than the quill shaft 372. Rotation of armature member 380 at a greater speed than quill shaft 372 causes rotor member 352 to also rotate slightly faster than quill shaft 372 while the rotor member 354 is rotated slightly slower than the quill shaft by an equal speed differential. As a result, the rotor members 352, 354 are relatively rotated until a limit stop (not shown) is encountered to define the first relative rotational position thereof. In their first position, the rotor members 352, 354 cooperate to define a short-circuiting magnetic flux path, as described with regard to the embodiment of the invention illustrated by FIGS. 5 and 6.

When it is desired to increase the voltage output of dynamo 350, the A.C. excitation current is removed from servo motor 382 and a D.C. excitation current is applied thereto. In this mode of operation, a torque is applied to armature member 380 which resists rotation thereof. As a result, the armature member 380 begins to rotate slower than quill shaft 372. So to, the rotor member 352 is rotated slightly slower than the quill shaft while the rotor member 354 is rotated slightly faster by an equal speed differential. The rotor members 352, 354 are in this way relatively rotated until another limit stop (not shown) is encountered which defines a second relative rotational position therefor.

In the second positions of rotor members 352, 354, the rotor members present a maximum magnetic flux to the stator member of dynamo 350 so that the voltage generated therein is a maximum value in view of the speed of operation of the dynamo, as explained supra with regard to FIGS. 5 and 6.

Figure 9:
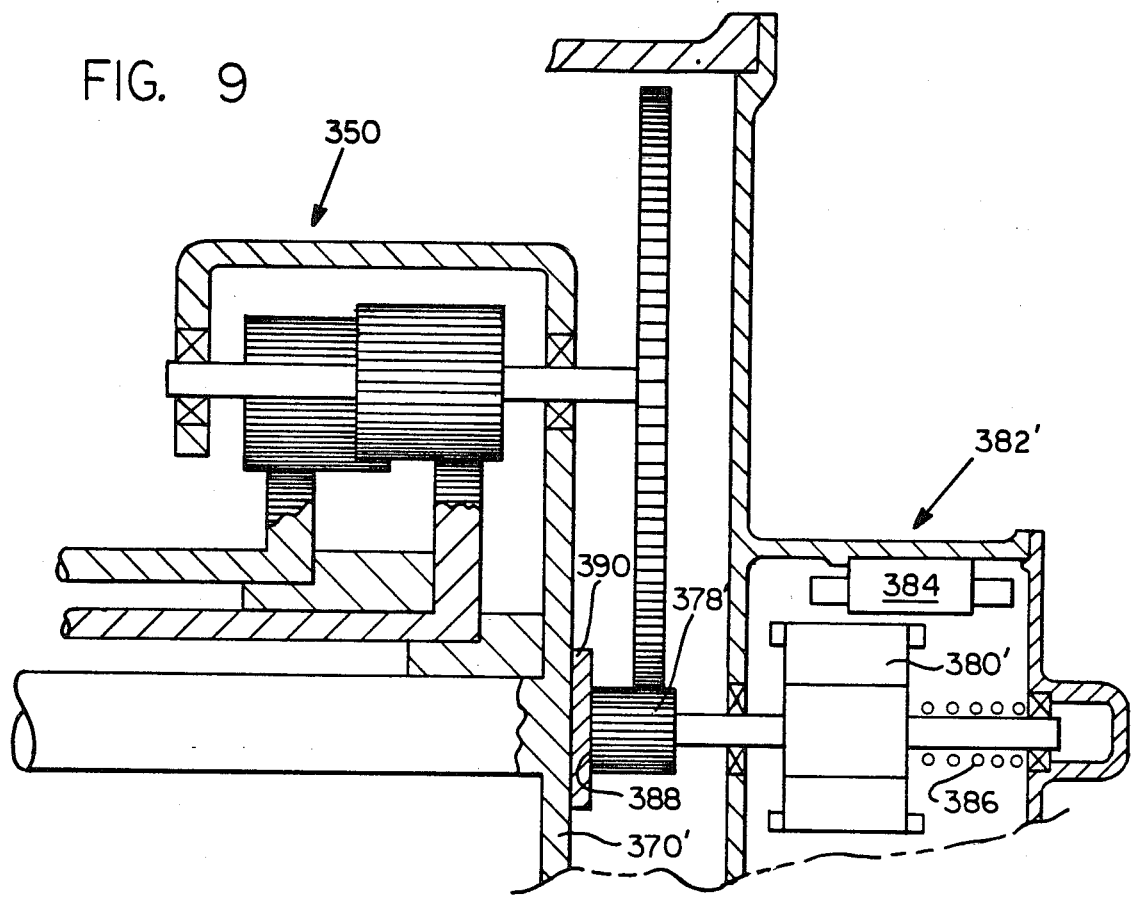
FIG. 9 illustrates a fragmentary view partly in cross section of another alternative embodiment of the invention which is related to the embodiment illustrated by FIGS. 7 and 8 and which is somewhat enlarged relative thereto.

FIG. 9 depicts yet another alternative embodiment of the invention which includes many features in common with the embodiment illustrated by FIG. 7. Because of the similarities between the embodiments of FIGS. 7 and 9, features of the latter which are analogous in structure or function to those of the former are referenced with the same numeral used supra and having a prime added.

The dynamo 350' fragmentarily illustrated by FIG. 9 includes a servo motor 382'. The armature member 380' of motor 382 is biased leftwardly by a coil compression spring 386 to a first operative position. In its first position, the armature member 380' is displaced slightly to the left of a stator portion 384' of motor 382 and a radially extending face 388 of pinion gear 378' frictionally engages a pad 390 of friction material which is carried upon carrier member 370'. Consequently, the armature member 380' is frictionally locked to quill shaft 372 for rotation in unison therewith.

In order to adjust the relative rotational positions of the shaft portions 358', 360', and of the rotor members attached thereto, the A.C. or D.C. excitation current applied to servo motor 382' is increased to a level such that magnetic attraction between the stator portion 384' and armature 380' draws the latter rightwardly to overcome spring 386 and disengage face 388 from pad 390. Consequently, the armature 380' is free to rotate either faster or slower than quill shaft 372' under the influence of the exciting current to adjust the relative rotational position of the rotor members 352', 354'. After the rotor members 352', 354' have been adjusted relative to one another, the exciting current to servo motor 382' is cut off so that spring 386 once again engages face 388 with pad 390 to maintain the relative rotational position of the rotor members.

While the present invention has been described and depicted by reference to a few preferred embodiments thereof, no limitation upon the invention is implied by each reference and none is to be inferred. The invention is intended to be limited only by the scope and spirit of the appended claims which provide a definition of the invention.

I claim:

1. Electrical dynamo apparatus comprising:
an electrical conductor connectable to complete an electrical circuit, a permanent magnet movable relative to said electrical conductor, said permanent magnet providing a pair of magnetic poles of opposite polarity and a magnetic flux flowing between said pair of magnetic poles, first means defining a first magnetic circuit for communicating said magnetic flux between said pair of magnetic poles, said first magnetic circuit having a first magnetic reluctance and transecting said electrical conductor to induce an electromotive force therein in response to the combination of movement of said electrical conductor relative to said permanent magnet and flow of said magnetic flux in said first magnetic circuit, second means defining a second alternative magnetic circuit for communicating said magnetic flux between said pair of magnetic poles, said second magnetic circuit having a second magnetic reluctance and being exclusive of said electrical conductor, one of said first and said second means further including a portion which is movable relative to the remainder thereof between a first and a second relative position for varying one of said first and said second magnetic reluctance, in said first relative position of said movable portion said first magnetic circuit predominating to communicate substantially all of said magnetic flux flow across said electrical conductor, said movable portion shifting to said second relative position to communicate a substantial portion of said magnetic flux flow via said second magnetic circuit to reduce magnetic flux flow in said first magnetic circuit and thereby to adjust said electromotive force, wherein said first means comprises a rotatable member and a nonrotatable member, said rotatable member carrying said permanent magnet, said nonrotatable member circumscribing said rotatable member and supporting said electrical conductor, said nonrotatable member having said relatively movable portion, said relatively movable portion being shiftable axially between said first position wherein said relatively movable portion is radially congruent with said permanent magnet and said second position wherein said relatively movable portion is substantially out of radial congruence with said permanent magnet.

2. The invention of claim 1 wherein said dynamo includes a housing journalling said rotatable member and supporting said nonrotatable member, said relatively movable portion comprising an annular member circumscribing the remainder of said nonrotatable member, said housing movably supporting said annular member for axial translation relative thereto.

3. The invention of claim 2 further including an actuator carried by said housing and engaging said annular member to selectively move the latter axially.

4. The invention of claim 3 wherein said relatively movable portion includes another annular member also circumscribing the remainder of said nonrotatable member, said housing movably supporting said another annular member for axial translation relative thereto, said actuator engaging said another annular member to selectively move the latter simultaneously in opposition to said annular member.

5. The invention of claim 4 wherein said annular member and said another annular member cooperate to substantially define said first and said second positions of said relatively movable portion, in said first position of said relatively movable portion said annular member and said another annular member being contiguous and in radial congruence with said permanenet magnet to define a portion of said first magnetic circuit, in said second position of said relatively movable portion said annular member and said another annular member being axially separated and noncongruent radially with said permanent magnet to open said first magnetic circuit.

6. The invention of claim 4 wherein said housing includes axially extending guide means for guiding axial movement of both of said annular members while constraining rotation thereof.

7. The invention of claim 6 wherein said actuator comprises an elongate axially extending rotatable member threadably engaging each of said annular members, rotation of said elongate member simultaneously moving said annular members in opposite axial directions.

8. The invention of claim 5 wherein said remainder of said nonrotatable member comprises a plurality of axially stacked annular laminations cooperating to define a circumferential multitude of axially extending grooves opening radially thereon, said electrical conductor being received into said axially extending grooves.

9. The invention of claim 8 wherein said annular member and said another annular member each include a multitude of axially stacked annular laminations.

10. The invention of claim 9 wherein said nonrotatable member further includes a multitude of elongate axially extending rod members respectively received in said multitude of axially extending grooves, said plurality of annular laminations and said electrical conductor being united into a unitary assembly with said multitude of elongate rod members by a cured potting compound, said multitude of elongate rod members engaging said housing to support said plurality of laminations and said electrical conductor.

11. The invention of claim 2 wherein said dynamo further includes an elongate inperforate sleeve member interposed radially between said rotatable member and said nonrotatable member, said sleeve member being nonmagnetic and magnetically permeable and sealingly cooperating with said housing to bound a substantially closed cavity receiving said rotatable member.

12. The invention of claim 2 wherein said remainder of said nonrotatable member comprises an annular assembly interposed radially between said relatively movable portion and said rotatable member, said annular assembly including a multitude of axially extending elongate bars alternating circumferentially with a like member of elongate stacks of laminations, said elongate bars being nonmagnetic and magnetically permeable, said multitude of bars cooperating with said like number of elongate lamination stacks to define a plurality of axially extending grooves opening radially on said annular assembly, said grooves receiving said electrical conductor, a cured potting compound uniting said electrical conductor and said annular assembly into a unitary subassembly.

13. The invention of claim 1 wherein said first means further comprises said rotatable member having a magnetically conductive core portion, said permanent magnet being disposed on said rotatable member with one of said pair of magnetic poles adjacent said core portion and the other of said pair of magnetic poles disposed radially outwardly.

14. The invention of claim 13 wherein said second means comprises a pair of nonmagnetic bars having a relatively high magnetic reluctance, said pair of nonmagnetic bars sandwiching said permanent magnet to inhibit magnetic flux flow between said pair of poles.

15. The invention of claim 14 wherein said first means further includes a pair of permanent magnets sandwiching said pair of nonmagnetic bars and said permanent magnet therebetween, each of said pair of permanent magnets providing a respective pair of magnetic poles of opposite polarity and a magnetic flux flowing therebetween, said pair of permanent magnets being disposed on said rotatable member with respective magnetic poles of like polarity adjacent to said core portion, said respective magnetic poles being of opposite magnetic polarity from said one magnetic pole.

16. The invention of claim 15 wherein said second means further includes a pair of elongate magnetic shunt members respectively disposed upon said pair of nonmagnetic bars, said pair of shunt members each extending circumferentially from adjacent said other magnetic pole of said permanent magnet toward but short of the magnetic poles of said pair of permanent magnets which have opposite magnetic polarity from said other magnetic pole.

17. The invention of claim 1 wherein said first means comprises a rotatable member and a nonrotatable member, said rotatable member carrying said permanent magnet, said nonrotatable member circumscribing said rotatable member and supporting said electrical conductor, said rotatable member substantially defining said second means and having said relatively movable portion, said relatively movable portion being rotatable relative to the remainder of said rotatable member.

18. The invention of claim 17 wherein said remainder of said rotatable member includes a nonmagnetic hub and said permanent magnet, said permanent magnet being disposed upon said hub with said opposite magnetic poles facing circumferentially, a pair of magnetic pole pieces respectively engaging said pair of magnetic poles to sandwich said permanent magnet therebetween.

19. The invention of claim 18 wherein said relatively movable portion comprises a second nonmagnetic hub, and a second permanent magnet disposed upon said second hub with second opposite magnetic sales thereof facing circumferentially, a second pair of magnetic pole pieces respectively engaging said second opposite magnetic poles to sandwich said second permanent magnet, in said first position of said relatively movable portion said pair of magnetic pole pieces and said second pair of magnetic pole pieces being axially aligned with axially aligning ones of said pole pieces being of like magnetic polarity, said second hub being relatively rotatable to define said second position of said relatively movable portion wherein one of said pair of magnetic pole pieces is axially aligned with one of said second pair magnetic pole pieces of opposite magnetic polarity, magnetic flux flowing axially between said axially aligned pole pieces of opposite polarity to diminish magnetic flux flow in said first magnetic circuit.

20. The invention of claim 19 further including means for selectively moving said relatively movable portion.

21. The invention of claim 20 wherein said moving means comprises an armature member which is rotatable relative to said rotatable member, linkage means coupling said armature member with said rotatable member to shift said relatively movable portion between said first and said second positions in response to relative rotation of said armature member, resilient means biasing said relatively movable portion to one of said first and said second relative positions to induce rotation of said rotatable member, and nonrotatable magnetic means for rotating said armature member relative to said rotatable member.

22. The invention of claim 21 wherein said moving means includes brake means for selectively inhibiting relative rotation of said armature member and said rotatable member except when said relative rotation is caused by said nonrotatable magnetic means.

23. The invention of claim 22 wherein said brake means comprises said armature member being axially movable, said armature member carrying an element which is frictionally engageable with said rotatable member to inhibit relative rotation therebetween, resilient means biasing said element into frictional engagement with said rotatable member, said armature member being axially offset relative to said nonrotatable magnetic means so that magnetization of the latter moves said armature member axially in opposition to said resilient means to disengage said element from said rotatable member.

24. The invention of claim 21 wherein said linkage means comprises said rotatable member including an elongate hollow shaft.

25. Electric dynamo apparatus comprising:
a housing;
a rotor member journaled by said housing and carrying a permanent magnet;
a stator member nonrotatably carried by said housing and supporting an electrical load coil;
said rotor member and said stator member comprising cooperating means for defining a first magnetic circuit including said permanent magnet and transecting said load coil;
said dynamo further comprising means for defining an alternative magnetic circuit including said permanent magnet and exclusive of said load coil;
one of said cooperating means and said means defining said alternative magnetic circuit further including a relatively movable portion movement of which adjusts an electrical voltage output of said load coil; and
said cooperating means comprises said stator member including said relative movable portion, said relatively movable portion circumscribing the remainder of said stator member and being axially movable relative thereto.

26. The invention of claim 25 wherein said relatively movable portion comprises a pair of axially movable annular members circumscribing said remainder of said stator member.

27. The invention of claim 26 wherein each annular member of said pair of annular members is axially movable in a direction opposite to the other annular member of said pair of annular members between a first position wherein said pair of annular members is radially congruent with the remainder of said stator member and a second position wherein each annular member is noncongruent with the latter.

28. The invention of claim 27 further including actuator means for axially moving said pair of annular members.

29. The invention of claim 25 wherein said means defining said alternative magnetic circuit comprises said rotor member carrying said permanent magnet with a pair of magnetically opposite pole faces thereof oriented radially oppositely, a magnetic core portion of said rotor member disposed adjacent to a radially inwardly oriented one of said pair of pole faces, and a pair of nonmagnetic members sandwiching said permanent magnet therebetween to inhibit magnetic flux flow in said nonmagnetic members.

30. The invention of claim 29 wherein said alternative magnetic circuit defining means further comprises said rotor member including a pair of permanent magnets sandwiching said pair of nonmagnetic members and said permanent magnet therebetween, each one of said pair of permanent magnetic being disposed adjacent to said magnetic core portion and being of opposite magnetic polarity from said radially inwardly oriented pole face of said permanent magnet.

31. The invention of claim 30 wherein said means defining said alternative magnetic circuit further comprises a pair of magnetic shunt members respectively carried by said pair of nonmagnetic members, said pair of shunt members each being spaced from and extending from adjacent the radially outwardly oriented pole face of said permanent magnet toward but short of the radially outwardly oriented pole faces of a respective one of said pair of permanent magnets.

32. The invention of claim 25 wherein said remainder of said stator member comprises a circumferentially disposed multitude of axially elongate magnetic laminate stacks, said multitude of laminate stacks being circumferentially interdigitated with a like number of axially elongate nonmagnetic bars, said multitude of laminate stacks and said multitude of bars being united into a unitary assembly with said electrical load coil by a cured potting compound.

33. The invention of claim 26 wherein said means defining said alternative magnetic circuit comprises said relatively movable portion, said relatively movable portion being rotatable relative to the remainder of said rotor member.

34. The invention of claim 33 wherein said rotor member carries said permanent magnet with a pair of magnetically opposite pole faces thereof oriented circumferentially, a pair of magnetic pole pieces respectively associated with said pair of pole faces to present magnetically opposite magnetic poles radially outwardly on said rotor member, said means defining said alterntive magnetic circuit further comprising said relatively movable portion carrying another permanent magnet which is axially adjacent said permanent magnet, said another permanent having a pair of magnetically opposite pole faces which are oriented circumferentially, like facing pole faces of said permanent magnet and said another permanent magnet being of like magnetic polarity, another pair of pole pices respectively associated with said respective pair of pole faces of said another permanent magnet to present magnetically opposite magnetic poles radially outwardly on said relatively movable portion, said relatively movable portion in a first position presenting like magnetized ones of said pair of pole pieces and said another pair of pole pieces axially adjacent and aligning, said relatively movable portion moving to a second position wherein one of said pair of pole pieces is axially aligned and adjacent a magnetically opposite one of said another pair of pole pieces, and means for moving said relatively movable portion between said first and said second position.

35. The invention of claim 34 wherein said moving means comprises a rotatable armature member which is corotational with said rotor member, linkage means coupling said rotor member with said armature member for urging corotation thereof and for moving said relatively movable portion between said first and said second positions in response to a mismatch of rotational speed between said rotor member and said armature member, and electromagnetic means in association with said armature member for causing said rotational speed mismatch.

36. The invention of claim 35 wherein said moving means further comprises brake means for inhibiting said rotational speed mismatch at all times except when said speed mismatch is positively caused by said electromagnetic means.

37. The invention of claim 36 wherein said brake means comprises said armature member being axially movable to frictionally engage said rotor member for corotation therewith, resilient means for urging said armature member into frictional engagement with said rotor member, said armature member being so disposed relative to said electromagnetic means that the latter when magnetized overcomes said resilient means to move said armature member axially away from said rotor member to allow rotation therebetween.

38. The invention of claim 35 wherein said moving means further comprises resilient means for urging said relatively movable portion toward one of said first and second positions.

39. The invention of claim 25 or 35 further including an inperforate sleeve member circumscribing said rotor member and sealingly cooperating with said housing to define a substantially closed evacuable cavity rotatably receiving said rotor member.

40. The method of controlling the voltage output of a permanent magnet electrical generator to a selected voltage level despite variations of the operating speed of said generator said method including the steps of:
providing a pair of alternative magnetic circuits for conducting magnetic flux flow from said permanent magnet, one of said pair of magnetic circuits transecting an electrical load coil of said generator to induce said output voltage therein, the other of said pair of magnetic circuits being substantially exclusive of said load coil; and
adjusting the magnetic reluctance of one of said pair of magnetic circuits to control the magnetic flux flow in said one magnetic circuit so as to control said voltage output, and
said adjusting step comprising moving a magnetic member relative to the remainder of said generator to insert and remove said magnetic member from said one magnetic circuit.

41. The method of claim 40 wherein said adjusting step further comprises substituting an air gap having a high magnetic reluctance for said magnetic member as the latter is removed from from said one magnetic circuit.

42. The method of claim 40 wherein said adjusting step comprises moving a magnetic short-circuiting member relative to the remainder of said generator to insert and remove said short-circuiting member from said other magnetic circuit.

43. An electrical generator comprising a generator housing, a rotor member journaled by said generator housing, said rotor member carrying a permanent magnet for providing magnetic flux, a nonrotatable stator assembly carried by said generator housing, said stator assembly carrying an immovable electrical load coil which is connectable in circuit with an electrical load, said stator assembly further including a magnetically conductive portion radially outwardly of the remainder thereof which is axially movable relative to the remainder of said stator assembly, in a first position said stator portion being in congruence with said remainder of said stator assembly to facilitate flow of said magnetic flux therein transecting said load coil, said stator portion in a second position being substantially noncongruent with said remainder of said stator assembly to inhibit said magnetic flux flow therein means for selectively moving said stator portion between said first and said second positions.

44. The invention of claim 43 wherein said stator assembly is annular and circumscribes said rotor member, said stator portion further being annular and circumscribing the remainder of said stator assembly.

45. The invention of claim 44 wherein said stator portion comprises a pair of substantially identical members, said members being contiguous in said first position of said stator portion, said members simultaneously moving apart in opposite axial directions to said second position thereof to define an air space therebetween congruent with said remainder of said stator assembly.

46. The invention of claim 43 wherein said moving means comprises an actuator rotatably carrying an elongate axial jack screw, said jack screw drivingly engaging each of said pair of identical members for axially moving the latter in response to rotation of said jack screw.

47. The invention of claim 46 wherein said generator housing defines axially extending guide means engaging said stator portion for guiding axial movement thereof while constraining rotation thereof.

48. The invention of claim 43 further including resilient means for urging said stator portion toward said second position thereof.

49. The invention of claim 43 further including an inperforate magnetically permeable sleeve member sealingly cooperating with said generator housing to define a substantially closed cavity rotatably receiving said rotor member.

50. The invention of claim 44 wherein said remainder of said stator assembly comprises an axial stack of annular magnetic laminations, said lamination stack defining a circumferential plurality of axially extending grooves opening radially on said lamination stack, said load coil being received in said grooves, a plurality of nonmagnetic rod members received in said grooves and secured to said lamination stack, said rod members engaging said generator housing to support said lamination stack.

51. The invention of claim 44 said remainder of said stator assembly comprises a multitude of axially elongate stacks of axially stacked magnetic laminations, said lamination stacks being circumferentially interdigitated with a like number of nonmagnetic magnetically permeable bar members, said laminate stacks and said bar members cooperating to define a plurality of axial grooves opening radially upon said remainder of said stator assembly and receiving said load coil.

52. The invention of claim 43 wherein said rotor member comprises means for communicating said magnetic flux flow therein exclusive of said load coil when said stator portion is in said second position.

53. The invention of claim 52 wherein said communicating means comprises a magnetic shunt member carried by said rotor member, said magnetic shunt member extending from adjacent one of a pair of magnetic poles of said permanent magnet toward but short of an opposite magnetic pole.

54. An electrical generator comprising a generator housing, an elongate shaft member journalled by said housing, an annular stator member circumscribing said shaft member and concentric therewith, said stator member carrying an electrical load coil which is connectable in circuit with an electrical load, a first rotor member carried by said shaft member and nonrotatably coupled thereto for rotation within said stator member, said first rotor member carrying a permanent magnet for providing magnetic flux to said stator member, a second rotor member rotatably carried by said shaft member closely adjacent axially to said first rotor member within said stator member, said first rotor member comprising means for alternatively conducting said magnetic flux radially to said stator member to transect said load coil and axially to said second rotor member exclusive of said load coil, said second rotor member comprising means for inhibiting said axial flux conduction in a first relative rotational position of said second rotor member and for promoting said axial flux conduction in a second relative rotational position thereof, whereby said magnetic flux is conducted radially to said stator member in said first position of said second rotor member, and means for moving said second rotor member between said first and said second positions.

55. The invention of claim 54 wherein said first rotor member carries said permanent magnet with a pair of opposite magnetic poles thereof disposed in opposite circumferential directions, said conducting means comprising a pair of magnetic pole pieces sandwiching said permanent magnet circumferentially to respectively engage said pair of opposite poles, each of said pair of pole pieces extending radially to confront said stator member to define a first air gap therewith and extending axially to confront said second stator member to define a second air gap therewith.

56. The invention of claim 55 wherein said inhibiting means comprises another permanent magnet carried by said second rotor member with another pair of opposite magnetic poles of said second permanent magnet disposed in opposite circumferential directions, another pair of magnetic pole pieces sandwiching said another permanent magnet circumferentially to respectively engage said another pair of magnetic poles, in said first position of said second rotor member, each of said another pair of pole pieces aligning axially with a respective one of said pair of pole pieces and being of like magnetic polarity to inhibit said axial flux conduction.

57. The invention of claim 56 wherein said second rotor member in said second position thereof aligns one of said another pair of pole pieces with one of said pair of pole pieces of opposite magnetic polarity to promote said axial flux conduction.

58. The invention of claim 54 wherein said moving means comprises a rotatable armature member which is rotatable relative to said elongate shaft member, linkage means coupling said armature member with said shaft member and said second rotor member for moving the latter between said first and said second positions in response to relative rotation of said armature member and shaft member, and electromagnetic means in association with said armature member for causing relative rotation of said armature member and said shaft member.

59. The invention of claim 58 wherein said generator further comprises resilient means urging said second rotor member to one of said first and second positions, said armature member comprising a circumferentially extending induction ring, and said electromagnetic means comprising an eddycurrent induction coil carried by said generator housing, said induction coil when electrically energized presenting a plurality of circumferentially disposed magnetic poles of sequentially opposite polarity to said induction ring to inhibit rotation of said armature member, said linkage means comprising a planetary speed reducing gear train arranged to move said second rotor member to the other of said first and second positions in response to said inhibition of rotation of said armature member.

60. The invention of claim 58 wherein said armature member and said electromagnetic means in cooperation define a servo motor for rotating said armature member.

61. The invention of claim 60 wherein said moving means further comprises brake means for inhibiting spurious relative rotational movement between said shaft member and said armature member.

62. The invention of claim 61 wherein said brake means comprises said armature emmber being axially movable and coaxial with said shaft member, said shaft member carrying a first element rotational therewith, said armature member carrying a second element rotational therewith and axially confronting said first element, resilient means urging said armature member axially to a first position to frictionally coengage said first and said second elements, said armature member and said electromagnetic means further being so aligned in said first position that magnetization of the latter magnetically urges said armature member axially to a second position to disengage said first and said second elements.

63. The invention of claim 58 wherein said linkage means comprises a first gear member rotational with said first rotor member, a second like gear member rotational with said second rotor member, a carrier member rotational relative to both said first and said second rotor members, a pair of meshed like pinion gears journaled by said carrier member, each one of said pair of pinion gears meshing with a respective one of said first and said second gear members, and gear means coupling one of said pair of pinion gears with said armature member for rotating said pinion gears in response to relative rotation of said carrier member and said armature member.

* * * * *